No. 771,770. PATENTED OCT. 4, 1904.
R. DAVIES.
MACHINE FOR MEASURING, BAGGING, AND REGISTERING GRAIN.
APPLICATION FILED FEB. 10, 1903.
NO MODEL.
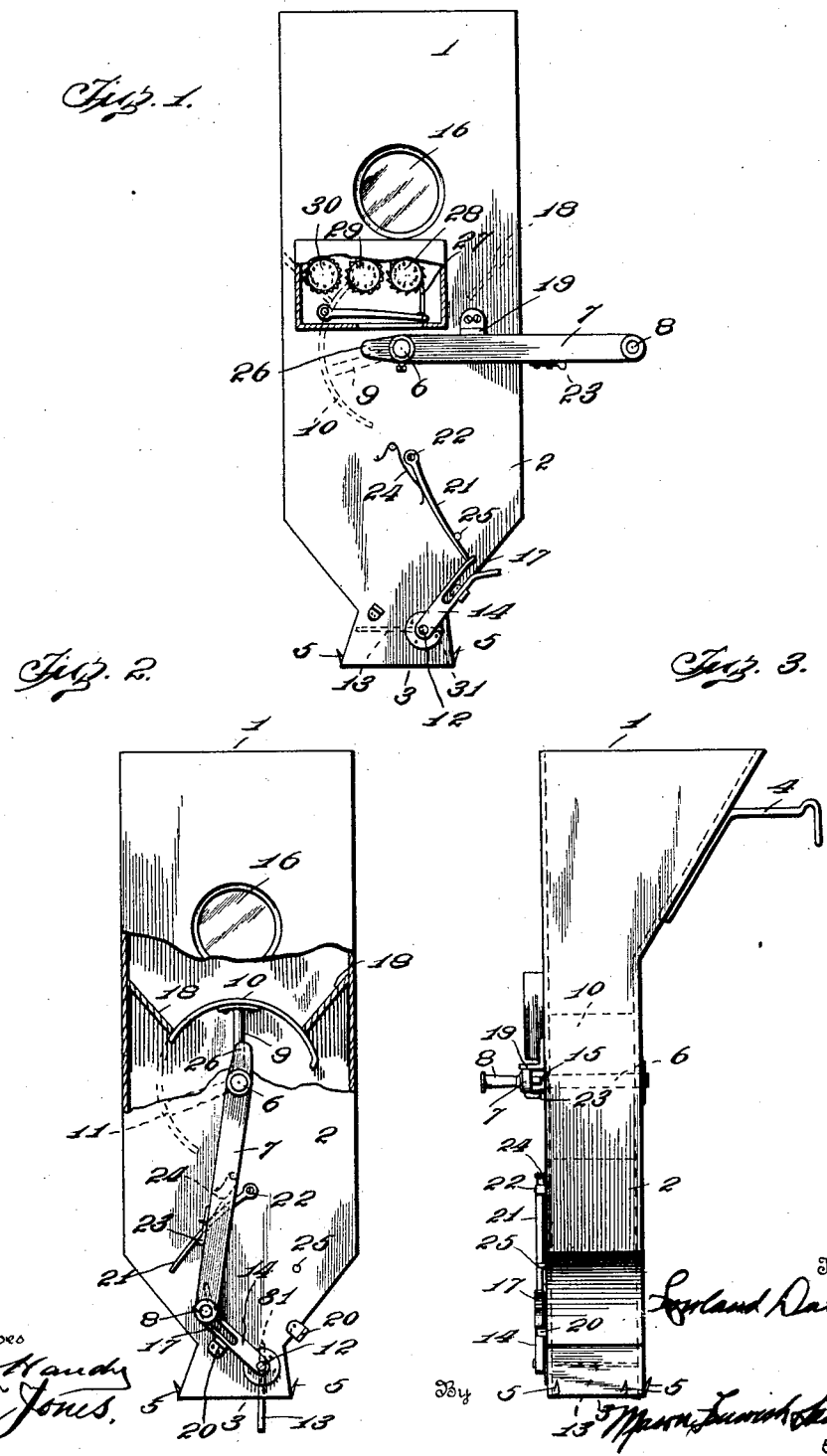

No. 771,770.

Patented October 4, 1904.

UNITED STATES PATENT OFFICE.

ROWLAND DAVIES, OF UTICA, WISCONSIN.

MACHINE FOR MEASURING, BAGGING, AND REGISTERING GRAIN.

SPECIFICATION forming part of Letters Patent No. 771,770, dated October 4, 1904.

Application filed February 10, 1903. Serial No. 142,797. (No model.)

*To all whom it may concern:*

Be it known that I, ROWLAND DAVIES, a citizen of the United States, residing at the town of Utica, in the county of Winnebago and State of Wisconsin, have invented new and useful Improvements in Machines for Measuring, Bagging, and Registering Grain, of which the following is a specification.

My invention relates to an apparatus for measuring, bagging, and registering grain as it comes from the threshing-machine; and the objects of my invention are to simplify the construction and render definite the operation of the device.

In the accompanying drawings, Figure 1 is a front view of my device closed for admission of the grain, the front of the tally-box being cut away to show the registering mechanism. Fig. 2 represents a similar view opened to discharge the grain, a portion of the grain-receptacle being cut away to show the operation of the cut-off device. Fig. 3 represents a side view when closed at the position shown in Fig. 1.

Similar numerals refer to similar parts in each view.

1 represents the hopper integral with the measuring-box 2.

3 represents the outlet.

The entire apparatus is attached to the threshing-machine beneath the elevator by hooks 4. The bags are attached to the hooks 5 5 5 at the outlet.

6 represents a shaft journaled in the front and rear walls of the measuring-box and revolved by the handle-bar 7 and handle 8.

9 represents an arm mounted on the shaft 6 and keyed thereto so as to revolve therewith. The arm supports the circular plate 10, which in its revolution closes and opens the bottom of the hopper 1. The dotted position 11, Fig. 2, shows the same open as when the handle-bar 7 is raised to the position shown in Fig. 1.

12 represents a shaft journaled in the front and rear walls of the box and carrying in its revolution the outlet-gate 13.

14 represents a grooved arm which is keyed to the shaft 12.

15 is a pin opposite the handle 8.

In the position shown in Fig. 1 the outlet-gate 13 is closed and the measuring-box 2 open to receive the grain from the threshing-machine.

The grain is allowed to pour into the measuring-box until it is observed above the bottom of the hopper through the circular window 16. Then after attaching the bag the operator presses downward and revolves the handle 8 until the pin 15 enters the top of the grooved arm 14. The plate 10 in its revolution will have cut off the grain in the hopper and closed the bottom of the hopper. A further revolution of the handle 8 causes the pin 15 to travel in the groove 17 and revolve the arm 14 to the position shown in Fig. 2, opening the gate 13 to discharge the grain into the bag. The handle 8 is then revolved upwardly and by the same action restores the arm 14 to its former position to close the gate 13 before opening the bottom of the hopper. The plate 10 is longer than the opening formed by the inclined sides of the hopper 18 18 for this purpose, as will be observed.

19 represents a stop above the handle-bar, and 20 20 represent stops to confine the revolution of the arm 14.

21 is a pawl pivoted to the box at 22 and adapted to lock the arm 14 in the position shown in Fig. 1 to prevent the sudden dropping of the grain from opening the gate 13. When the handle 8 is revolved downwardly, the pin 23 engages the pawl 21 and revolves it to unlock the arm 14. The pawl is returned to its former position as the handle is raised by the spring 24.

25 is a stop to engage the pawl at the proper position for locking.

26 represents a finger opposite to and integral with the handle-bar 7 and revolving therewith.

27 is a pawl operating the ratchet-wheel 28. The said pawl 27 is of considerable length and is pivoted so as to normally lie in an approximately horizontal position. A portion of this pawl is bent upwardly to a slight extent to form a bearing which serves for receiving the end of the finger 26. The free end of the pawl 27 is provided with an upwardly-extending projection for engaging the teeth of the ratchet-wheel 28.

Each time as the handle is pressed downward to empty the box and fill the bag the finger 26 operates to raise the pawl 27 and operate the ratchet-wheel 28. The pawl then drops to its former position by gravity.

29 and 30 represent ratchet-wheels similar to 28. Each ratchet-wheel is supplied with ten cogs, and on the face of each are provided consecutive numbers "1" to "0," inclusive.

28 represents units-wheel, 29 the tens-wheel, and 30 the hundreds-wheel. A lug is provided on each of the units and tens wheels that in one revolution revolves one cog of the wheel of next higher denomination. By this means the finger 26 operates to register each bag of grain.

It is advisable to locate the shaft 12 about midway between the center and one side of the outlet-spout 13 to facilitate and at the same time balance the dump of the grain. The short arm 31 of the gate 13 serves to balance the pressure upon the opposite side of the shaft sufficiently to prevent tearing of the bag. At the same time the unbalanced pressure upon the long side of the gate is sufficient to facilitate the dumping.

Therefore what I claim as my invention, and desire to secure by Letters Patent, is—

1. A grain-bagging mechanism comprising a hopper formed with a feed-compartment and a delivery-compartment a shaft arranged below the outlet of the feed-compartment, a valve formed of a curved plate made concentric with the said shaft, a lever secured to the said shaft for turning the same and operating the valve, a valve controlling the outlet of the discharge-compartment, an arm operating the same, the arm of the said shaft moving the arm of the said valve positively from one position to the other, substantially as described.

2. In a mechanism of the class described, the combination with a hopper and a receptacle beneath the same formed with an opening at its lower end, of a valve for said hopper, a valve for said lower end of said receptacle, a shaft rotatably supporting said hopper-valve, an operating-arm connected with said shaft, a pin projecting from said arm, a shaft rotatably supporting the valve closing the opening to said receptacle, and an arm connected to said last-mentioned shaft and formed with an open-ended slot, the end of said arm projecting normally into the path of movement of the pin carried by said first-mentioned arm.

3. A grain-bagging apparatus comprising a hopper formed with upper and lower compartments, a semicylindrical plate controlling the discharge-opening of the upper compartment, a lever for moving the same, a shaft journaled in the hopper, and carrying said semicircular plate the said lever moving the said shaft, a valve pivoted in the discharge-outlet of the lower compartment, an arm for moving the same formed with a groove in one side, a pin projecting from the said lever and arranged to engage the groove of the said arm so that when the upper compartment is closed the lower compartment may be permitted to discharge its contents, substantially as described.

4. A grain-bagging device comprising a hopper, an upper and lower compartment formed therein, a valve or damper controlling the outlet of the lower compartment, an arm for moving said valve, a spring-pressed pawl normally holding said arm with the valve in its closed position, and a lever pivoted upon the said hopper for engaging the said arm to operate the valve, the said lever also moving the pawl out of engagement with the arm for permitting the operation of said arm, substantially as described.

5. In a mechanism of the class described, the combination with a receptacle and a hopper discharging into the same, of a cut-off for said hopper, said receptacle being formed with an opening, a valve for closing said opening, a shaft supporting said valve, an arm engaging said shaft, a spring-compressed pawl normally locking said arm in position for retaining said valve in a closed condition, means for actuating the hopper cut-off, means carried by said actuating means for releasing said pawl, and means also carried by said actuating means for actuating said arm.

6. In a mechanism of the class described, the combination with a hopper, of a receptacle receiving the discharge therefrom, said receptacle being formed with an opening, a plate forming a valve for closing said opening, a shaft fixed to said plate to one side of the central line of the plate, actuating means engaging said shaft for rotating the same, a cut-off for said hopper provided with a lever, means for operating said lever, and means carried thereby for operating said shaft-actuating means.

7. In a mechanism of the class described, the combination with a receptacle and a hopper discharging into the same, of a cut-off for said hopper, said receptacle being formed with an opening, a valve closing said opening, a shaft supporting said valve, a slotted arm carried by said shaft, the slot in said arm opening at the end thereof, means for locking said arm against movement for retaining the valve in a closed position, an arm actuating the cut-off of said hopper, means carried by said arm for releasing said locking means, and means also carried by said arm for engaging the slot of said arm for actuating the arm and limiting the same in its movement.

In testimony whereof I have hereunto set my hand in the presence of two subscribing witnesses.

ROWLAND DAVIES.

Witnesses:
A. R. WATERHOUSE,
L. M. FULLEY.